US012656907B2

(12) United States Patent
Lee et al.

(10) Patent No.: US 12,656,907 B2
(45) **Date of Patent: *Jun. 16, 2026**

(54) TOUCH DISPLAY DEVICE APPLYING A DRIVING SIGNAL DURING A TOUCH PERIOD

(71) Applicant: LG Display Co., Ltd., Seoul (KR)

(72) Inventors: Jeongseop Lee, Paju-si (KR); Sunguk Byun, Paju-si (KR); Woorim Jeong, Paju-si (KR); Hankyu Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,280

(22) Filed: Jan. 26, 2025

(65) Prior Publication Data

US 2025/0173021 A1     May 29, 2025

Related U.S. Application Data

(60) Continuation of application No. 18/414,275, filed on Jan. 16, 2024, now Pat. No. 12,242,694, which is a
(Continued)

(30) Foreign Application Priority Data

Dec. 16, 2020     (KR) ........................ 10-2020-0176069

(51) Int. Cl.
*G09G 3/20* (2006.01)
*G06F 3/041* (2006.01)

(52) U.S. Cl.
CPC ............. *G06F 3/0418* (2013.01); *G09G 3/20* (2013.01); *G09G 2310/08* (2013.01)

(58) Field of Classification Search
CPC ..... G06F 3/0418; G09G 3/20; G09G 2310/08
See application file for complete search history.

(56) References Cited

U.S. PATENT DOCUMENTS

| | | |
|---|---|---|
| 11,614,830 B2 | 3/2023 | Lee et al. |
| 11,907,476 B2 | 2/2024 | Lee et al. |
| | (Continued) | |

FOREIGN PATENT DOCUMENTS

| | | |
|---|---|---|
| EP | 2975498 A1 | 1/2016 |
| EP | 3232303 A1 | 10/2017 |
| | (Continued) | |

OTHER PUBLICATIONS

Office Action issued on Apr. 21, 2025 for Korean Patent Application No. 10-2020-0176069.
(Continued)

*Primary Examiner* — Sejoon Ahn
(74) *Attorney, Agent, or Firm* — Morgan, Lewis & Bockius LLP

(57) ABSTRACT

A touch display device includes a touch display panel including touch electrodes, display lines, and touch lines. A touch driving signal is configured to be applied to at least one touch electrode among the touch electrodes through at least one corresponding touch line among the touch lines during a touch period. A driving signal is configured to be applied to at least one of the display lines during the touch period. The driving signal has a same frequency as the touch driving signal and has a phase difference from the touch driving signal during at least a portion of the touch period.

16 Claims, 14 Drawing Sheets

Related U.S. Application Data division of application No. 18/119,365, filed on Mar. 9, 2023, now Pat. No. 11,907,476, which is a continuation of application No. 17/517,867, filed on Nov. 3, 2021, now Pat. No. 11,614,830.

(56) References Cited

U.S. PATENT DOCUMENTS

| | | | |
|---|---|---|---|
| 2012/0162133 A1 | 6/2012 | Chen et al. | |
| 2016/0018916 A1 | 1/2016 | Lee et al. | |
| 2017/0090673 A1* | 3/2017 | Kim | G06F 3/0418 |
| 2017/0300165 A1* | 10/2017 | Shin | G06F 3/04166 |
| 2018/0107309 A1* | 4/2018 | Endo | G06F 3/0416 |
| 2018/0107315 A1 | 4/2018 | Lee et al. | |
| 2018/0173342 A1 | 6/2018 | Lee et al. | |
| 2019/0204968 A1* | 7/2019 | Hur | G06F 3/0412 |
| 2019/0339858 A1* | 11/2019 | Wang | G06F 3/0488 |
| 2019/0353520 A1* | 11/2019 | Li | G09G 3/20 |
| 2019/0354225 A1* | 11/2019 | Rhim | G06F 3/044 |
| 2019/0355304 A1* | 11/2019 | Tanaka | G01K 7/22 |
| 2019/0384452 A1 | 12/2019 | Kang et al. | |
| 2020/0097127 A1* | 3/2020 | Kim | G06F 3/0446 |
| 2020/0210022 A1 | 7/2020 | Kim et al. | |
| 2020/0387279 A1* | 12/2020 | Kim | G06F 3/0412 |
| 2020/0387282 A1* | 12/2020 | Huang | G06F 3/0443 |
| 2020/0388201 A1* | 12/2020 | Wang | G09G 3/20 |
| 2020/0388219 A1* | 12/2020 | Meng | G09G 3/2007 |
| 2020/0388227 A1* | 12/2020 | Yang | G09G 3/3266 |
| 2020/0389691 A1* | 12/2020 | Yoshizawa | G09G 3/20 |

FOREIGN PATENT DOCUMENTS

| | | | |
|---|---|---|---|
| JP | 2013-506172 A | 2/2013 | |
| KR | 10-2017-0071685 A | 6/2017 | |
| KR | 10-2017-0119282 A | 10/2017 | |
| KR | 10-2018-0041304 A | 4/2018 | |
| KR | 10-2020-0080791 A | 7/2020 | |
| TW | 201823956 A | 7/2018 | |
| TW | 201931089 A | 8/2019 | |

OTHER PUBLICATIONS

Combined Search and Examination Report issued in GB Patent App No. 2116131.0, dated Jul. 6, 2022.

Office Action dated Oct. 20, 2022, in counterpart Taiwanese Patent Application No. 110142809 (with partial English translation).

Office Action issued on Nov. 5, 2024 in Chinese Patent Application No. 202111315288.8.

* cited by examiner

TOUCH DISPLAY DEVICE APPLYING A DRIVING SIGNAL DURING A TOUCH PERIOD

CROSS-REFERENCE TO RELATED APPLICATIONS

This application is a continuation of U.S. patent application Ser. No. 18/414,275, filed on Jan. 16, 2024, which is a divisional of U.S. patent application Ser. No. 18/119,365, filed on Mar. 9, 2023, now U.S. Pat. No. 11,907,476, which is a continuation of U.S. patent application Ser. No. 17/517,867, filed on Nov. 3, 2021, now U.S. Pat. No. 11,614,830, which claims the benefit and priority from Korean Patent Application No. 10-2020-0176069, filed in the Republic of Korea on Dec. 16, 2020. The entire contents of each of the above prior U.S. and Korean patent applications are hereby incorporated by reference for all purposes as if fully set forth into the present application.

BACKGROUND

Technical Field

Embodiments of the present disclosure relate to a touch display device and a touch sensing circuit.

Discussion of the Related Art

As the information society develops, demands for a display device for displaying an image are increasing in various forms, and in recent years, various display devices such as a liquid crystal display device and an organic light emitting display device are used.

Recently, a touch display device that provides an easy touch input method in a display has been utilized, breaking away from the conventional input method such as a button, a mouse, and a keyboard.

The touch display device has high utilization due to the convenience of input and can be applied to various technical fields. In some cases, a touch display device may be used in an environment in which various electronic devices are disposed.

Meanwhile, various electronic devices may exist around the touch display device. When electronic devices are adjacent to the touch display device, touch accuracy of the touch display device may be degraded due to electromagnetic wave noise emitted from not only the touch display device but also the surrounding electronic devices.

SUMMARY

Accordingly, embodiments of the present disclosure are directed to a touch display device and a touch sensing circuit that substantially obviates one or more of the problems due to limitations and disadvantages of the related art.

An aspect of the present disclosure is to provide a touch display device and a touch sensing circuit having improved resistance to electromagnetic noise.

An aspect of the present disclosure is to provide a touch display device and a touch sensing circuit capable of removing electromagnetic noise and increasing touch accuracy by lowering a cutoff frequency without adding a capacitor element.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a touch display device comprises: a touch display panel including a plurality of touch electrodes, a plurality of data lines, a plurality of gate lines, and a plurality of sub-pixels; a data driving circuit configured to drive the plurality of data lines; a gate driving circuit configured to drive the plurality of gate lines; and a touch sensing circuit configured to output a pulse type touch driving signal to at least one of the plurality of touch electrodes. While the touch driving signal is output to the at least one touch electrode, a gate line load-free driving signal is applied to all or part of the plurality of gate lines, a data line load-free driving signal is applied to all or part of the plurality of data lines, or a touch electrode load-free driving signal is applied to all or part of the remaining touch electrodes except for the at least one touch electrode among the plurality of touch electrodes. At least one load-free driving signal of the gate line load-free driving signal, the data line load-free driving signal, and the touch electrode load-free driving signal has the same frequency as the touch driving signal, and has a phase difference or amplitude difference from the touch driving signal.

The touch display device may further include a phase delay circuit configured to delay a phase of at least one of the gate line load-free driving signal, the data line load-free driving signal, the touch electrode load-free driving signal, and the touch driving signal.

The phase difference between the at least one load-free driving signal and the touch driving signal may be greater than 0 (zero) and less than half a wavelength of the touch driving signal.

The touch driving signal and the data line load-free driving signal may be signals whose phases are delayed compared to the gate line load-free driving signal. A phase difference between the touch driving signal and the gate line load-free driving signal may be smaller than a phase difference between the data line load-free driving signal and the gate line load-free driving signal. A phase difference between the data line load-free driving signal and the gate line load-free driving signal may be less than half a wavelength of the touch driving signal.

The at least one touch electrode, a peripheral pattern adjacent to the at least one touch electrode, and a sensing line electrically connecting the at least one touch electrode and the touch sensing circuit may constitute a low pass filter. The cutoff frequency of the low pass filter may be determined according to a capacitance between the touch electrode and the peripheral pattern and a resistance of the sensing line. The peripheral pattern may include at least one of a gate line applied with the gate line load-free driving signal, a data line applied with the data line load-free driving signal, and a touch electrode applied with the touch electrode load-free driving signal. The cutoff frequency of the low pass filter may become smaller as the phase difference or the amplitude difference between the at least one load-free driving signal and the touch driving signal is greater than zero.

The touch display device may further include a level shifter configured to convert an amplitude of at least one of the gate line load-free driving signal, the data line load-free driving signal, the touch electrode load-free driving signal, and the touch driving signal.

When the at least one load-free driving signal has the amplitude difference from the touch driving signal, according to a position of the touch electrode to which the touch driving signal is applied in the touch display panel, the at least one load-free driving signal may have an amplitude greater than an amplitude of the touch driving signal or smaller than an amplitude of the touch driving signal.

When the at least one load-free driving signal has the amplitude difference from the touch driving signal, an operation period of the touch display device may include: a first time period in which an amplitude of the at least one load-free driving signal is smaller than an amplitude of the touch driving signal; and a second time period in which the amplitude of the at least one load-free driving signal is greater than the amplitude of the touch driving signal.

The first time period may overlap at least partially with the second time period.

In another aspect, a touch sensing circuit comprises: a touch driving circuit configured to output a pulse type touch driving signal to at least one of a plurality of touch electrodes disposed on a touch display panel; and a load-free driving signal output circuit configured to output at least one load-free driving signal having a frequency equal to a frequency of the touch driving signal and having a phase difference or amplitude difference from the touch driving signal.

The load-free driving signal output circuit may include a gate driving circuit configured to drive a plurality of gate lines disposed on the touch display panel. In this case, the at least one load-free driving signal may include a gate line load-free driving signal applied to all or part of the plurality of gate lines.

The load-free driving signal output circuit may include a data driving circuit configured to drive a plurality of data lines disposed on the touch display panel. In this case, the at least one load-free driving signal may include a data line load-free driving signal applied to all or part of the plurality of data lines.

The load-free driving signal output circuit may include a circuit configured to apply the at least one load-free driving signal to all or part of the remaining touch electrodes except for the at least one touch electrode among the plurality of touch electrodes. In this case, the at least one load-free driving signal may include a touch electrode load-free driving signal applied to all or part of the remaining touch electrodes.

The touch sensing circuit may further include a phase delay circuit configured to generate the phase difference between the at least one load-free driving signal and the touch driving signal.

The touch sensing circuit may further include a level shifter configured to generate the amplitude difference between the at least one load-free driving signal and the touch driving signal.

According to embodiments of the present disclosure, it is possible to provide a touch display device and a touch sensing circuit having improved resistance to electromagnetic noise.

According to embodiments of the present disclosure, it is possible to provide a touch display device and a touch sensing circuit capable of removing electromagnetic noise and increasing touch accuracy by lowering a cutoff frequency without adding a capacitor element.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
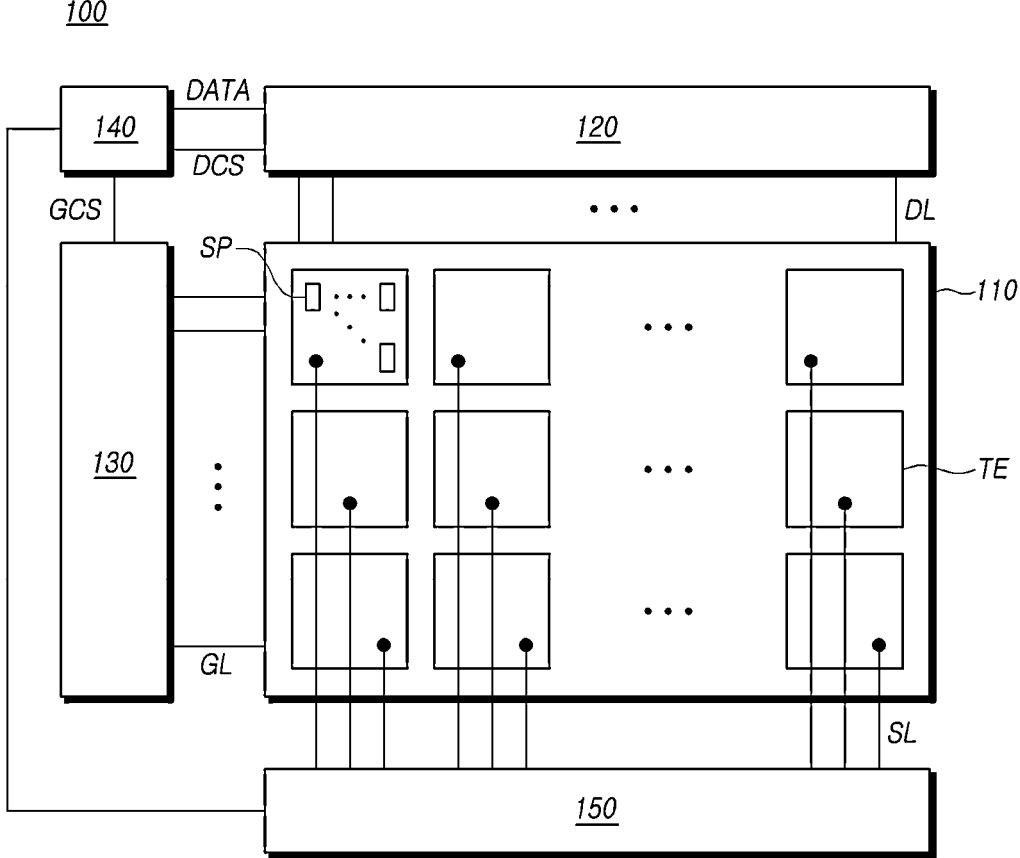
FIG. 1 is a system configuration diagram of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Figure 2:
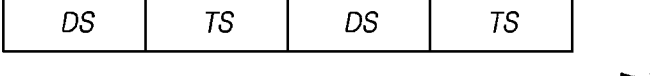
FIG. 2 is a timing diagram for an image display period and a touch period, which are operation periods of the touch display device according to embodiments of the present disclosure.

FIG. 1 is a system configuration diagram of a touch display device 100 according to embodiments of the present disclosure. FIG. 2 is a timing diagram for an image display period DS and a touch period TS, which are operation periods of the touch display device 100 according to embodiments of the present disclosure.

Referring to FIG. 1, the touch display device 100 according to embodiments of the present disclosure includes a touch display panel 110 on which a plurality of data lines DL and a plurality of gate lines GL are disposed, a data driver 120 configured to supply data voltages to the plurality of data lines DL, a gate driver 130 configured to supply scan signals to the plurality of gate lines GL, and a display controller 140 configured to control the data driver 120 and the gate driver 130 according to the data control signal DCS and the gate control signal GCS respectively. A plurality of sub-pixels SP may be formed in an area where the plurality of data lines DL and the plurality of gate lines GL cross each other.

The display controller 140 may control the data driver 120 and the gate driver 130 by supplying various control signals to the data driver 120 and the gate driver 130.

The display controller 140 may start scanning according to a timing implemented in each frame. The display controller 140 may control data driving according to the scanning operation. The display controller 140 may convert input image data input from the outside (e.g., Host system) to fit a data signal format used by the data driver 120 to output the converted image data signal DATA.

The gate driver 130 may supply scan signals of an on-level voltage or an off-level voltage to the plurality of gate lines GL under the control of the display controller 140.

When a specific gate line GL is driven and turned on by the gate driver 130, the data driver 120 may convert the image data signal DATA received from the display controller 140 into image analog signals and supply data signals corresponding to the converted image analog signals to the plurality of data lines DL.

The display controller 140 may be a timing controller used in a typical display technology, may be a control device that further performs other control functions in addition to the functions of the timing controller, or may be a control device different from the timing controller.

The display controller 140 may be implemented as a separate component from the data driver 120 or may be implemented as an integrated circuit integrated with the data driver 120.

The data driver 120 may drive the plurality of data lines DL by supplying data signals to the plurality of data lines DL. The data driver 120 is referred to as a data driving circuit or a source driver.

The data driver 120 may include at least one source driver integrated circuit (SDIC). Each source driver integrated circuit may include a shift register, a latch circuit, a digital to analog converter (DAC), an output buffer circuit, and the like. Each source driver integrated circuit may further include an analog-to-digital converter (ADC) in some cases.

Each source driver integrated circuit may be connected to the touch display panel 110 by a Tape Automated Bonding (TAB) method or a Chip On Glass (COG) method, or may be directly disposed on the touch display panel 110. Alternatively, each source driver integrated circuit may be directly integrated and disposed on the touch display panel 110. Alternatively, each source driver integrated circuit may be implemented in a Chip On Film (COF) method mounted on a film connected to the touch display panel 110.

The gate driver 130 may drive the plurality of gate lines GL by supplying scan signals to the plurality of gate lines GL. Here, the gate driver 130 is also referred to as a gate driving circuit or a scan driver.

Here, the scan signal may include an off-level gate voltage for turning off a transistor connected to the corresponding gate line GL and an on-level gate voltage for turning on a transistor connected to the corresponding gate line GL.

When the transistor is of an N type, the off-level gate voltage may be a low-level gate voltage VGL, and the on-level gate voltage may be a high-level gate voltage VGH. When the transistor is of the P type, the off-level gate voltage may be a high-level gate voltage VGH, and the on-level gate voltage may be a low-level gate voltage VGL. In the following, for convenience of description, the off-level gate voltage is the low-level gate voltage VGL, and the on-level gate voltage is the high-level gate voltage VGH.

The gate driver 130 may include at least one gate driver integrated circuit (GDIC). Each gate driver integrated circuit may include a shift register, a level shifter, and the like.

The gate driver 130 may be connected to a bonding pad of the touch display panel 110 in a Tape Automated Bonding (TAB) method or a Chip On Glass (COG) method. Alternatively, the gate driver 130 may be directly integrated and disposed on the touch display panel 110. Alternatively, the gate driver 130 may be implemented in a Gate In Panel (GIP) method and disposed on the touch display panel 110. Alternatively, the gate driver 130 may be implemented in a chip-on-film (COF) method mounted on a film connected to the touch display panel 110.

As shown in FIG. 1, the data driver 120 may be positioned only on one side (e.g., upper or lower side) of the touch display panel 110. In some cases, the data driver 120 may be located on both sides of the touch display panel 110 (e.g., upper and lower sides) according to a driving method, a panel design method, or the like.

As shown in FIG. 1, the gate driver 130 may be positioned only on one side (e.g., left or right) of the touch display panel 110. In some cases, the gate driver 130 may be located on both sides (e.g., left and right) of the touch display panel 110 according to a driving method, a panel design method, or the like.

The touch display device 100 according to embodiments of the present disclosure may further include a plurality of touch electrodes TE and a touch sensing circuit 150 to provide a touch sensing function. The touch sensing circuit 150 may drive at least one of the plurality of touch electrodes TE and sense at least one of the plurality of touch electrodes TE. The touch sensing circuit 150 may detect the presence or absence of a touch and/or touch coordinates using the sensing result. The touch sensing circuit 150 may receive a signal (e.g., touch synchronization signal Tsync (see FIG. 4), etc.) for controlling the driving timing of the touch sensing circuit 150 from the display controller 140. The touch sensing circuit 150 may refer to a circuit including two or more circuits that output signals for providing a touch sensing function.

The plurality of touch electrodes TE disposed on the touch display panel 110 may be dedicated touch sensors for touch sensing. Alternatively, the plurality of touch electrodes TE disposed on the touch display panel 110 may serve as a touch sensor for touch sensing and a display driving electrode for driving an image display. For example, when the plurality of touch electrodes TE serve as both a touch sensor and a display driving electrode, a common voltage for driving a display may be applied to the plurality of touch electrodes TE during the image display period DS, and a touch driving signal may be applied to one or more of the plurality of touch electrodes TE during the touch period TS. The touch display panel 110 may include a display panel including a plurality of sub-pixels SP and a touch panel including a plurality of touch electrodes TE. The touch panel may be a separate panel different from the display panel. In this case, the touch panel is bonded to the display panel, and may be referred to as an add-on type touch panel. Alternatively, the touch panel may exist inside the display panel. In this case, the touch panel may be formed during the manufacturing process of the display panel, and may be referred to as a built-in type touch panel.

Referring to FIG. 2, the operation period of the touch display device 100 according to embodiments of the present disclosure may include an image display period DS and a touch period TS. In the touch display device 100, the image display period DS and the touch period TS may be time-divided. Accordingly, image display driving and touch driving may be alternately performed. Alternatively, the image display period DS and the touch period TS may overlap.

Accordingly, image display driving and touch driving may be performed simultaneously. In the following, for convenience of description, it is assumed that the operation period of the touch display device 100 is time-divided into the image display period DS and the touch period TS.

Figure 3:
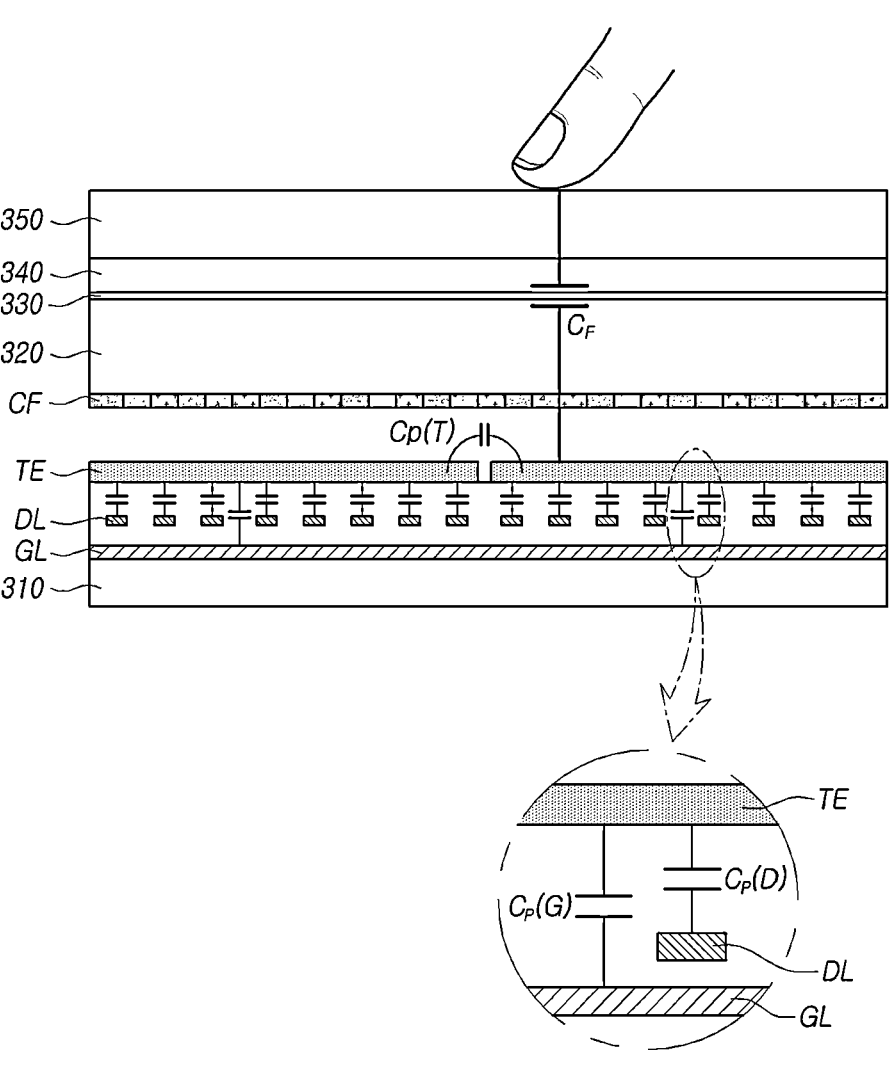
FIG. 3 is a cross-sectional view of the touch display device according to embodiments of the present disclosure.

FIG. 3 is a cross-sectional view of the touch display device 100 according to embodiments of the present disclosure.

For example, the touch display device 100 according to embodiments of the present disclosure may be various types of display devices such as a liquid crystal display device and an organic light emitting display device. Accordingly, the touch display panel 110 of the touch display device 100 according to embodiments of the present disclosure may be various display panels such as a liquid crystal display panel and an organic light emitting display panel.

FIG. 3 exemplarily illustrates a cross-sectional structure of the touch display panel 110 that is a liquid crystal display panel when the touch display device 100 according to embodiments of the present disclosure is a liquid crystal display device.

Each sub-pixel SP disposed on the touch display panel 110 may include one or more circuit elements (e.g., a transistor, a capacitor, etc.).

For example, when the touch display panel 110 is a liquid crystal display panel, a pixel electrode may be disposed in each sub-pixel SP, and a transistor may be electrically connected between the pixel electrode and the data line DL. The transistor may be turned on by a scan signal supplied to the gate node through the gate line GL. When the transistor is turned on, the data signal supplied to the source node (or drain node) of the transistor through the data line DL may be output to the drain node (or source node) of the transistor. The data signal output to the drain node (or source node) of the transistor may be transmitted to the pixel electrode electrically connected to the drain node (or source node) of the transistor. An electric field may be formed between the pixel electrode to which the data signal is applied and the common electrode to which the common voltage is applied.

The structure of each sub-pixel SP may be variously determined according to a panel type, a function provided, a design method, and the like.

Referring to FIG. 3, the touch display panel 110 according to embodiments of the present disclosure may be a liquid crystal display panel.

When the touch display panel 110 is a liquid crystal display panel, the touch display device 100 may include a backlight unit under the touch display panel 110. The backlight unit may provide light to the touch display panel 110.

Referring to FIG. 3, the touch display panel 110 may include a lower substrate 310, an upper substrate 320, and a liquid crystal layer between the lower substrate 310 and the upper substrate 320. Here, each of the lower substrate 310 and the upper substrate 320 may be a glass substrate or a plastic substrate. A backlight unit may be positioned under the lower substrate 310. Thin film transistors and capacitors for configuring the sub-pixels SP may be formed on the lower substrate 310, and various signal wires for driving the sub-pixels SP may be formed on the lower substrate 310. A liquid crystal alignment layer may be positioned on the lower substrate 310. In addition, color filters CF and the liquid crystal alignment layer may be positioned between the lower substrate 310 and the upper substrate 320.

A common electrode to which a common voltage is applied may be disposed on the lower substrate 310 or the upper substrate 320. In a horizontal electric field driving method such as an In-Plane Switching (IPS) mode and a Fringe Field Switching (FFS) mode, the common electrode may be formed on the lower substrate 310 together with the pixel electrode. In a vertical electric field driving method such as a TN (Twisted Nematic) liquid crystal mode and a VA (Vertical Aligned Nematic) liquid crystal mode, the pixel electrode may be formed on the lower substrate 310, and the common electrode may be formed on the upper substrate 320.

The touch display panel 110 may further include the color filters CF for obtaining a color image. For example, the touch display panel 110 may obtain a color image using red, green, and blue color filters CF.

The touch display panel 110 may further include a polarizing plate 330 disposed on the outside of one or more of the lower substrate 310 and the upper substrate 320.

The polarizing plate 330 may have a single-layer structure or a multi-layer structure. For example, when the polarizing plate 330 has a multi-layer structure, the polarizing plate 330 may include a first support, a second support, and a polarizing material layer. The polarizing material layer may be positioned between the first support and the second support and may include a polymer polarizing material that polarizes incident light.

The touch display panel 110 may further include a cover glass 350 disposed on the polarizing plate 330 on the upper substrate 320. The polarizing plate 330 and the cover glass 350 may be adhered by an adhesive 340. The adhesive 340 may be a transparent adhesive, and may include, for example, Optically Clear Adhesive (OCA), Optically Clear Resin (OCR), or the like.

Each of the thin film transistors formed on the lower substrate 310 may be disposed in each sub-pixel SP, and may serve as a switch for transferring a data signal required for driving each sub-pixel SP from the data line DL to the sub-pixel SP.

Each data line DL may be disposed in a first direction of the touch display panel 110, and may transmit a data signal output from the data driver 120 to a corresponding sub-pixel SP. Each gate line GL may be disposed in the second direction different from the first direction of the touch display panel 110, and may transmit the gate signal output from the gate driver 130 to the gate nodes of the thin film transistors in the sub-pixels SP.

Meanwhile, during the touch period TS, a pulse type touch driving signal TDS (see FIG. 6) for sensing a touch may be applied to the touch electrode TE.

During the touch period TS, the pulse-type touch driving signal TDS is applied to the touch electrode TE, and a touch capacitance $C_F$ due to a touch of an external finger or pen may be formed in the touch electrode TE. The touch sensing circuit 150 may sense a degree of change in capacitance of the touch electrode TE due to the touch capacitance $C_F$ to detect the presence or absence of a touch and/or touch coordinates.

During the touch period TS, a parasitic capacitance may be formed in the touch electrode TE to which the touch driving signal TDS is applied. For example, during the touch period TS, a gate line parasitic capacitance Cp(G) may be formed between the touch electrode TE to which the touch driving signal TDS is applied and the gate line GL. During the touch period TS, a data line parasitic capacitance Cp(D) may be formed between the touch electrode TE to which the touch driving signal TDS is applied and the data line DL. During the touch period TS, a touch electrode parasitic capacitance Cp(T) may be formed between the touch electrode TE to which the touch driving signal TDS is applied and the adjacent touch electrode TE to which the touch driving signal TDS is not applied.

That is, a parasitic capacitance may be formed in the touch electrode TE to which the touch driving signal TDS is applied by at least one of the plurality of data lines DL, the plurality of gate lines GL, and the adjacent touch electrodes TE.

As the parasitic capacitances Cp(G), Cp(D), and Cp(T) are formed in the touch electrode TE, the phase of the touch driving signal TDS may be delayed or the amplitude of the touch driving signal TDS may be decreased. That is, as the parasitic capacitances Cp(G), Cp(D), and Cp(T) act as a load on the touch electrode TE, the phase of the touch driving signal TDS may be delayed or the amplitude of the touch driving signal TDS may be decreased. This phenomenon may be one of the main factors of the problem of the decrease in accuracy of touch sensing.

Accordingly, in order to reduce the parasitic capacitances Cp(G), Cp(D), and Cp(T) formed in the touch electrode TE, the touch driving signal TDS or a signal corresponding thereto may be applied to all or part of each of the plurality of data lines DL, the plurality of gate lines GL, and the remaining touch electrodes TE. Here, the touch driving signal TDS or a signal corresponding to the touch driving signal TDS applied to all or part of each of the plurality of data lines DL, the plurality of gate lines GL, and the remaining touch electrodes TE may be referred to as a load-free driving signal. In order to prevent the formation of parasitic capacitance, a driving in which a load-free driving signal is applied to all or part of each of the plurality of data lines DL, the plurality of gate lines GL, and the remaining touch electrodes TE is referred to as load-free driving.

In the case of the load-free driving, the load-free driving signal having no phase difference or amplitude difference from the touch driving signal TDS may be applied to the entirety of or part of each of the plurality of data lines DL, the plurality of gate lines GL, and the remaining touch electrodes TE.

Figure 4:
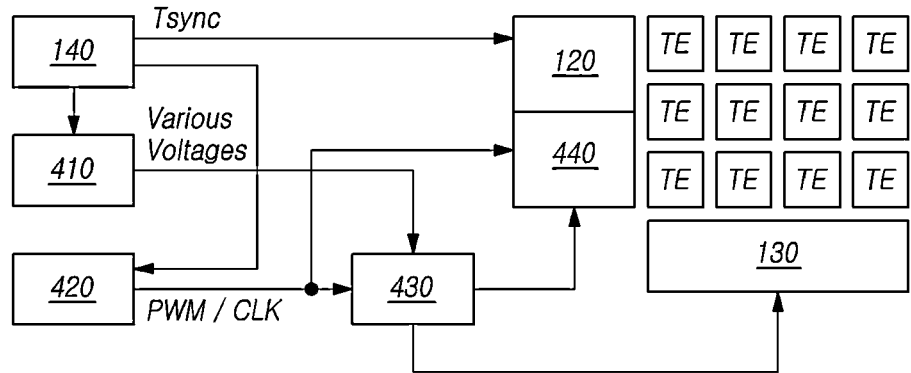
FIG. 4 is a block diagram of a load-free driving system of the touch display device according to embodiments of the present disclosure.

FIG. 4 is a block diagram of a load-free driving system of the touch display device 100 according to embodiments of the present disclosure.

Referring to FIG. 4, the touch display device 100 according to embodiments of the present disclosure may include a power management circuit 410, a touch controller 420, a touch driving signal generator 430, and a touch driving circuit 440.

Referring to FIG. 4, the display controller 140 may output the touch synchronization signal Tsync to the touch controller 420. The touch synchronization signal Tsync may be a signal defining the image display period DS and the touch period TS.

Referring to FIG. 4, the power management circuit 410 may supply various voltages (e.g., VDD, VGH, VGL, etc.) for generating the touch driving signal TDS and the load-free driving signal LFDS (see FIG. 5) to the touch driving signal generator 430.

The touch controller 420 may generate the touch driving generation signal PWM during the touch period TS according to the received touch synchronization signal Tsync, and may apply the generated touch driving generation signal PWM to the touch driving signal generator 430 and the touch driving circuit 440.

In this case, the touch controller 420 may output the touch driving generation signal PWM that is toggled a plurality of times during the touch period TS defined by the touch synchronization signal Tsync to the touch driving circuit 440.

Here, the number of times the touch driving generation signal PWM is toggled during the touch period TS may vary depending on the total number of touch electrodes TE sensed during one touch period TS and the number of touch electrodes TE simultaneously sensed by the touch driving circuit 440.

In order to synchronize the operations of the touch controller 420, the touch driving signal generator 430, and the touch driving circuit 440, the touch controller 420 may transmit a clock signal CLK to the touch driving signal generator 430 and the touch driving circuit 440. The touch controller 420 may directly generate the clock signal CLK or may receive the clock signal CLK from the display controller 140.

The touch driving signal generator 430 may generate the touch driving signal TDS according to the touch driving generation signal PWM and may output the generated touch driving signal TDS to the touch driving circuit 440.

That is, the touch driving generation signal PWM is a signal for generating the touch driving signal TDS, and may determine the frequency, phase, and amplitude of the touch driving signal TDS. The touch driving signal generator 430 may generate the touch driving signal TDS having a signal waveform corresponding to the signal waveform of the touch driving generating signal PWM.

For example, the touch driving signal generator 430 may generate the touch driving signal TDS having the same frequency as the touch driving generating signal PWM. That is, it is possible to generate the touch driving signal TDS that is toggled the same number of times as the touch driving generation signal PWM during the touch period TS.

In this case, the touch driving signal generator 430 may receive the touch synchronization signal Tsync, and may generate and output the touch driving signal TDS only during the touch period TS according to the received touch synchronization signal Tsync.

That is, the touch driving signal generator 430 may prevent the touch driving signal TDS from being toggled even if the toggled touch driving generating signal PWM is received during the non-touch period TS.

In addition, the touch driving signal generator 430 may output a signal having a predetermined voltage level to the touch driving circuit 440 during a period that is not the touch period TS. For example, the touch driving signal generator 430 may output a common voltage required for driving the display to the touch driving circuit 440 during a period other than the touch period TS.

Meanwhile, the touch driving circuit 440 may drive the plurality of touch electrodes TE by supplying the touch driving signal TDS to the plurality of touch electrodes TE during the touch period TS according to the received touch synchronization signal Tsync. The touch sensing circuit 150 may comprise the touch driving circuit 440 and a load-free driving signal output circuit configured to output at least one load-free driving signal having a frequency equal to a frequency of the touch driving signal TDS and having a phase difference or amplitude difference from the touch driving signal TDS. The load-free driving signal output circuit may include the gate driving circuit and/or data driving circuit. Alternatively, the load-free driving signal output circuit may include a circuit configured to apply the at least one load-free driving signal LFDS to all or part of the remaining touch electrodes except for the at least one touch electrode to which the touch driving signal TDS is applied among the plurality of touch electrodes TE.

As a driving method for the plurality of touch electrodes TE, the touch driving circuit 440 may sequentially drive one or two or more of the plurality of touch electrodes TE. As another driving method for the plurality of touch electrodes TE, the touch driving circuit 440 may drive all of the plurality of touch electrodes TE together.

The touch driving circuit 440 may accurately determine a timing to supply the touch driving signal TDS to the plurality of touch electrodes TE by receiving the touch driving generation signal PWM from the touch controller 420.

Figure 5:
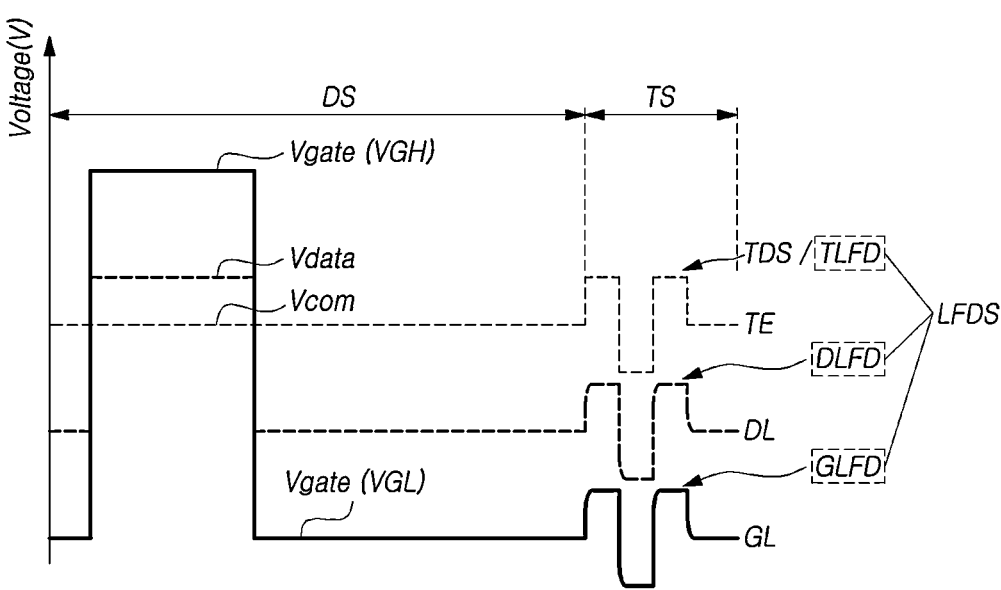
FIG. 5 exemplarily illustrates voltages applied to a touch electrode, a data line, and a gate line during an image display period and a touch period in the touch display device according to embodiments of the present disclosure.

FIG. 5 exemplarily illustrates voltages applied to the touch electrode TE, the data line DL, and the gate line GL during the image display period DS and the touch period TS in the touch display device 100 according to embodiments of the present disclosure.

During the image display period DS, a data signal Vdata for displaying image data may be applied to the data line DL. In addition, during the image display period DS, the scan signal Vgate having a turn-on level voltage VGH or a turn-off level voltage VGL may be applied to the gate line GL.

During the image display period DS, the plurality of touch electrodes TE may be used as common electrodes for image display. Accordingly, a common voltage Vcom (DC Voltage) for driving a display may be applied to the plurality of touch electrodes TE during the image display period DS.

When the touch display panel 110 is a liquid crystal display panel, the data signal Vdata applied to the data line DL may be the same voltage as the voltage applied to the pixel electrode of the sub-pixel SP. Here, the pixel electrode may be a transparent electrode. Accordingly, during the image display period DS, a voltage applied to the transparent electrode, which is a pixel electrode in the sub-pixel SP, may be equal to the voltage value of the data signal Vdata.

During the touch period TS, a touch driving signal TDS for touch sensing drive may be applied to the at least one touch electrode TE. During the touch period TS, the load-free driving may be performed on all or part of the plurality of data lines DL, the plurality of gate lines GL, and the remaining touch electrodes TE.

Referring to FIG. 5, during the touch period TS, a load-free driving signal LFDS may be applied to at least one of the data line DL and the gate line GL according to load-free driving. The load-free drive signal LFDS may include at least one of a data line load-free driving signal DLFD applied to the data line DL, a gate line load-free driving signal GLFD applied to the gate line GL, and a touch electrode load-free driving signal TLFD to all or a part of the remaining touch electrodes TE that are not subjected to touch sensing.

During the touch period TS, as the data line load-free driving signal DLFD is applied to the data line DL, a voltage difference between the touch electrode TE and the data line DL may be maintained constantly. Accordingly, the data line parasitic capacitance Cp(D) may be reduced or eliminated between the touch electrode TE and the plurality of data lines DL.

During the touch period TS, as the gate line load-free driving signal GLFD is applied to the gate line GL, a voltage difference between the touch electrode TE and the gate line GL may be maintained constantly. Accordingly, the gate line parasitic capacitance Cp(G) may be reduced or eliminated between the touch electrode TE and the plurality of gate lines GL.

During the touch period TS, as the touch electrode load-free driving signal TLFD is applied to all or part of the remaining touch electrodes TE, a voltage difference between the touch electrode TE to which the touch driving signal TDS is applied and the remaining touch electrodes TE to which the touch electrode load-free driving signal TLFD is applied may be maintained constantly. Accordingly, the touch electrode parasitic capacitance Cp(T) may be reduced or eliminated. The touch electrode TE to which the touch driving signal TDS is applied may be a touch electrode TE that is a touch sensing target. The remaining touch electrodes TE to which the touch electrode load-free driving signal TLFD is applied may be a touch electrodes that are not a touch sensing target.

As described above, the touch display device 100 may suppress the parasitic capacitance from acting as a load by performing load-free driving. Accordingly, touch accuracy may be increased.

Figure 6:
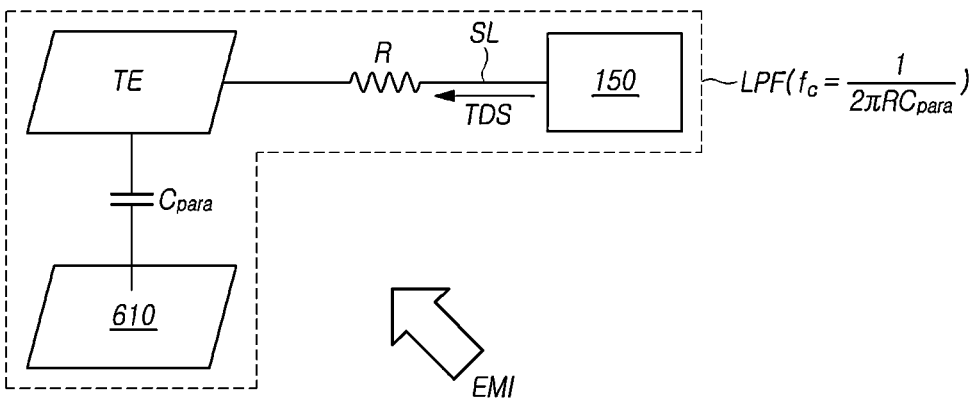
FIG. 6 conceptually illustrates a configuration of a low pass filter in the touch display device according to embodiments of the present disclosure.

FIG. 6 conceptually illustrates a configuration of a low pass filter LPF in the touch display device 100 according to embodiments of the present disclosure.

Referring to FIG. 6, the touch display device 100 according to embodiments of the present disclosure may include a low pass filter LPF electrically formed by the metals TE, 610, and SL disposed on the touch display panel 110. In terms of an equivalent circuit, the low pass filter LPF may be a resistor-capacitor circuit including a resistor R and a capacitor $C_{para}$. The capacitor $C_{para}$ of the low-pass filter LPF may be a parasitic capacitor present in the touch display panel 110, rather than a separate capacitor only for forming the low-pass filter LPF. The capacitor $C_{para}$ of the low-pass filter LPF may absorb (block) the high-frequency signal and pass the low-frequency signal. Accordingly, the low-pass filter LPF may be used to remove high-frequency noise.

Referring to FIG. 6, the touch driving signal TDS output from the touch sensing circuit 150 may be input to a touch electrode TE through a sensing line SL. In addition, a parasitic capacitance $C_{para}$ may be formed between the touch electrode TE and a peripheral pattern 610 in the touch display panel 110. For example, the peripheral pattern 610 may include a data line DL, a gate line GL, or another touch electrode TE. The peripheral pattern 610 may be disposed adjacent to the touch electrode TE, and the peripheral pattern 610 may be disposed to overlap the touch electrode TE.

The sensing line SL may be a wire connecting the touch sensing circuit 150 and the touch electrode TE, and may have a resistance R.

Referring to FIG. 6, the low pass filter LPF may be composed of the touch electrode TE to which the touch driving signal TDS is applied, the peripheral pattern 610 adjacent to the touch electrode TE, and the sensing line SL electrically connecting the touch electrode TE and the touch sensing circuit 150. For example, the low-pass filter LPF may be a first-order low-pass filter 1st LPF.

A cutoff frequency $f_c$ may be defined in the low pass filter LPF. The cutoff frequency $f_c$ may be a boundary point between a frequency band through which a signal passes and a frequency band through which a signal does not pass. Accordingly, the low pass filter LPF may block signals having a frequency higher than the cutoff frequency $f_c$. The touch display device 100 may remove electromagnetic noise EMI having a frequency $f_{EMI}$ (see FIG. 7) higher than the cutoff frequency $f_c$ through the low pass filter LPF. Accordingly, the effect of electromagnetic noise EMI may be alleviated to increase touch sensing accuracy.

Electromagnetic noise EMI may be an electromagnetic wave generated inside the touch display device 100, or an electromagnetic wave generated outside the touch display device 100 and introduced into the touch display device 100. For example, when the touch display device 100 is disposed inside a vehicle, the electromagnetic noise EMI may include external electromagnetic waves introduced into the touch display device 100 from an electronic device other than the touch display device 100.

Referring to FIG. 6, the cutoff frequency $f_c$ of the low pass filter LPF defined by the resistance R and the parasitic capacitance $C_{para}$ may be calculated through Equation 1 below.

$$f_c = \frac{1}{2\pi R C_{para}} \qquad \text{[Equation 1]}$$

Referring to Equation 1, the cut-off frequency $f_c$ may be inversely proportional to the magnitude of the resistance R and the magnitude of the parasitic capacitance $C_{para}$, respectively. That is, as the magnitude of the parasitic capacitance $C_{para}$ decreases, the cut-off frequency $f_c$ may increase. As the parasitic capacitance $C_{para}$ increases, the cutoff frequency $f_c$ may decrease.

During the touch period TS, when the touch driving signal TDS is applied to the touch electrode TE, a load-free driving may be performed. According to the load-free driving, the load-free driving signal LFDS may be applied to all or a part of the plurality of data lines DL, the plurality of gate lines GL, and the remaining touch electrodes TE. Here, the load-free driving signal LFDS may have the same frequency, amplitude, and phase as the touch driving signal TDS. Accordingly, the value of the parasitic capacitance $C_{para}$ formed in the touch electrode TE may decrease. Accordingly, the cutoff frequency $f_c$ of the low pass filter LPF may be increased.

Accordingly, the electromagnetic wave noise EMI having a frequency $f_{EMI}$ lower than the cutoff frequency $f_c$ cannot be removed, and thus a problem of lowering the touch sensing accuracy of the touch display device 100 may occur. That is, immunity (EMS) to electromagnetic noise may be reduced.

Figure 7:
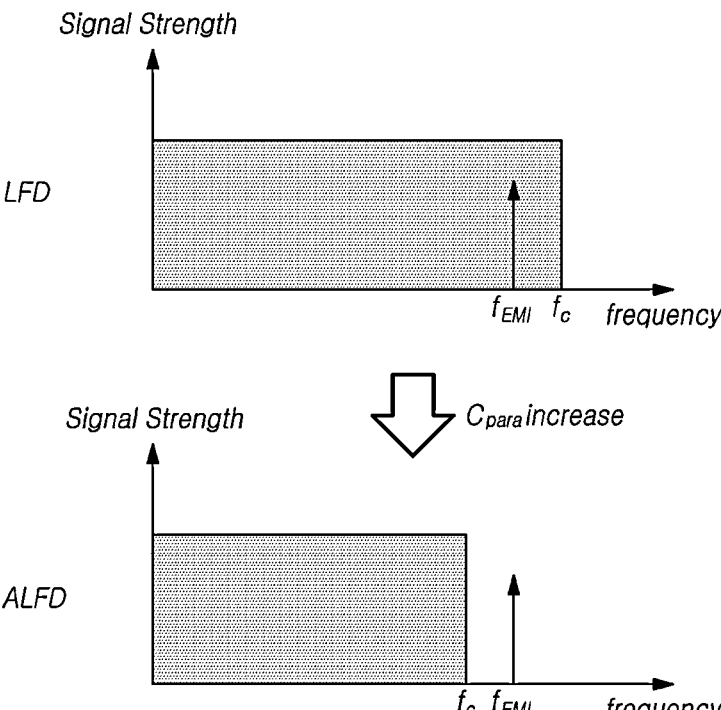
FIG. 7 is a diagram for explaining a principle of improving immunity to electromagnetic wave noise in the touch display device according to embodiments of the present disclosure.

FIG. 7 is a diagram for explaining a principle of improving immunity to electromagnetic wave noise in the touch display device 100 according to embodiments of the present disclosure. Here, the immunity to electromagnetic wave noise is also referred to as EMS (Electromagnetic Susceptibility).

Referring to FIG. 7, when the load-free driving LFD is performed, the cutoff frequency $f_c$ of the low pass filter LPF may be higher than the frequency $f_{EMI}$ of the electromagnetic noise EMI. Accordingly, the electromagnetic noise EMI having the frequency $f_{EMI}$ lower than the cutoff frequency $f_c$ of the low pass filter LPF may not be removed. Accordingly, the electromagnetic noise EMI may affect touch sensing accuracy of the touch display device 100.

Referring to FIG. 7, when advanced load-free driving ALFD is performed, a value of the parasitic capacitance $C_{para}$ formed between the touch electrode TE to which the touch driving signal TDS is applied and the peripheral pattern 610 may be increased within a reasonable range. Accordingly, the cut-off frequency $f_c$ of the low-pass filter LPF may be lowered. Here, the peripheral pattern 610 is a pattern disposed adjacent to the touch electrode TE, which is a touch sensing target, and may include at least one of a data line DL, a gate line GL, and another touch electrode TE. As the cutoff frequency $f_c$ of the low pass filter LPF is lowered, that is, as the cutoff frequency $f_c$ of a frequency lower than the frequency $f_{EMI}$ of electromagnetic noise EMI is defined, the electromagnetic noise EMI having a frequency $f_{EMI}$ higher than a cutoff frequency $f_c$ of the low pass filter LPF may be effectively removed.

On the other hand, when the parasitic capacitance $C_{para}$ becomes too large by the ALFD, electromagnetic noise EMI may be removed to increase touch sensing accuracy. However, when the parasitic capacitance $C_{para}$ becomes too large by the ALFD, the load increases too much, and thus, a side effect of lowering the touch sensing accuracy may occur. That is, even when ALFD is performed, when the parasitic capacitance $C_{para}$ increases beyond a certain range, touch sensing accuracy may be rather reduced.

The touch display device 100 may reduce the parasitic capacitance $C_{para}$ by performing the LFD, thereby improving touch sensing accuracy. However, the LFD has a side effect of lowering the touch sensing accuracy of the touch display device 100 because high-frequency electromagnetic noise EMI cannot be removed.

Accordingly, the touch display device 100 according to embodiments of the present disclosure performs an advanced load-free driving ALFD.

The touch display device 100 according to embodiments of the present disclosure may remove electromagnetic noise EMI by performing the ALFD. In order to perform the ALFD, the touch display device 100 according to embodiments of the present disclosure may lower the cut-off frequency $f_c$ of the low-pass filter LPF by controlling the increase of the parasitic capacitance $C_{para}$. The touch display device 100 according to the embodiments of the present disclosure may increase the parasitic capacitance $C_{para}$ within a reasonable range in which the load of the touch electrode TE does not excessively increase when controlling the increase of the parasitic capacitance $C_{para}$. Accordingly, the touch display device 100 according to embodiments of the present disclosure may provide the ALFD capable of improving overall touch sensitivity.

Referring to FIG. 7, the ALFD according to embodiments of the present disclosure has a low cut-off frequency $f_c$, so that the electromagnetic noise EMI can be effectively removed compared to the LFD. This can be made possible by increasing the parasitic capacitance $C_{para}$.

Figure 8A:
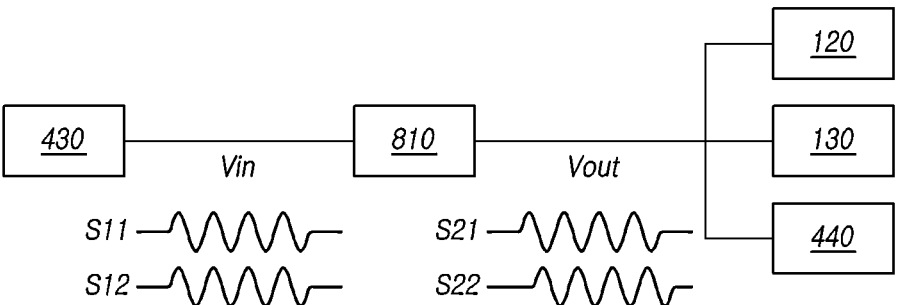
FIG. 8A illustrates a phase difference control system of the touch display device according to embodiments of the present disclosure.
Figure 8B:
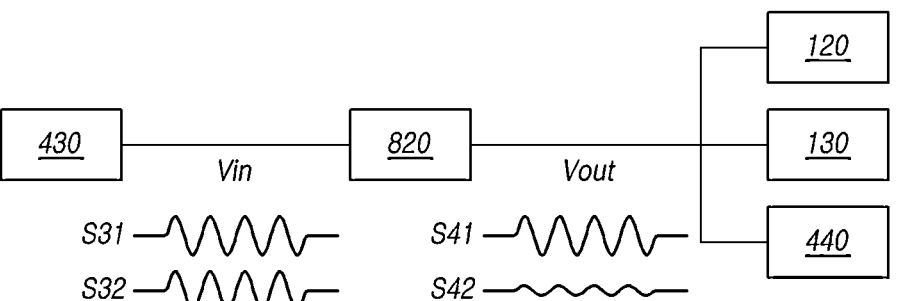
FIG. 8B illustrates an amplitude difference control system of the touch display device according to embodiments of the present disclosure.

FIG. 8A illustrates a phase difference control system of the touch display device 100 according to embodiments of the present disclosure. FIG. 8B illustrates an amplitude difference control system of the touch display device 100 according to embodiments of the present disclosure.

Referring to FIGS. 8A and 8B, the touch display device 100 according to embodiments of the present disclosure may include a phase difference control system and/or an amplitude difference control system. Referring to FIG. 8A, the phase difference control system of the touch display device 100 according to embodiments of the present disclosure may include a phase delay circuit 810. The phase delay circuit 810 may output a phase-delayed signal by delaying the phase of the input signal. Referring to FIG. 8B, the amplitude difference control system of the touch display device 100 according to embodiments of the present disclosure may include a level shifter 820. The level shifter 820 may output a signal obtained by modulating the amplitude of the input signal to be larger or smaller.

Referring to FIG. 8A, the phase delay circuit 810 may be located between the touch driving signal generator 430 and the data driver 120, or may be located between the touch driving signal generator 430 and the gate driver 130, or may be located between the touch driving signal generator 430 and the touch driving circuit 440.

The phase delay circuit 810 may be located in the touch controller 420, or may be located between the touch controller 420 and the touch driving signal generator 430, or may be located in the touch drive signal generator 430, or may be located in the data driver 120, the gate driver 130, and/or the touch driving circuit 440.

Referring to FIG. 8B, the level shifter 820 may be located between the touch driving signal generator 430 and the data driver 120, or may be located between the touch driving signal generator 430 and the gate driver 130, or may be located between the touch driving signal generator 430 and the touch driving circuit 440.

The level shifter 820 may be located in the touch controller 420, or may be located between the touch controller 420 and the touch driving signal generator 430, or may be located in the touch drive signal generator 430, or may be located in the data driver 120, the gate driver 130, and/or the touch driving circuit 440.

Referring to FIG. 8A, the phase delay circuit 810 may delay the phase of the input signal Vin to output the output signal Vout. In addition, the phase delay circuit 810 may delay the phase of the two or more input signals Vin by different delay levels to output the output signal Vout.

For example, the phase delay circuit 810 may receive the first input signal S11 and the second input signal S12, respectively, and may output the first output signal S21 and the second output signal S22, which are phase delayed by different phase values.

Alternatively, the phase delay circuit 810 may receive the first input signal S11 and the second input signal S12, respectively, may output the first output signal S21 with respect to the first input signal S11 as a non-phase-delayed signal, and may output the second output signal S22 with respect to the second input signal S12 as a phase-delayed signal.

Here, any one of the first output signal S21 and the second output signal S22 may be a touch driving signal TDS or a signal related to an output timing of the touch driving signal TDS. The other one of the first output signal S21 and the second output signal S22 may be one of a gate line load-free driving signal GLFD, a data line load-free driving signal DLFD, and a touch electrode load-free driving signal TLFD, or may be a signal related to an output timing of one of the gate line load-free driving signal GLFD, the data line load-free driving signal DLFD, and the touch electrode load-free driving signal TLFD.

At least one of the gate line load-free driving signal GLFD, the data line load-free driving signal DLFD, the touch electrode load-free driving signal TLFD, and the touch driving signal TDS may be a signal whose phase is delayed by the phase delay circuit 810.

Accordingly, at least one of the gate line load-free driving signal GLFD, the data line load-free driving signal DLFD, and the touch electrode load-free driving signal TLFD may have a phase difference from the touch driving signal TDS.

Referring to FIG. 8B, the level shifter 820 may output an output signal Vout by converting the amplitude of the input signal Vin. In addition, the level shifter 820 may output an output signal Vout by converting amplitudes of two or more input signals Vin to different degrees of conversion.

For example, the level shifter 820 may receive the third input signal S31 and the fourth input signal S32, respectively, and may output the third output signal S41 and the fourth output signal S42 whose amplitudes are amplified or reduced to different degrees of conversion, respectively. The amplitude of the third input signal S31 and the amplitude of the fourth input signal S32 may be the same. However, the converted amplitude of the third output signal S41 and the converted amplitude of the fourth output signal S42 may be different from each other.

In addition, the level shifter 820 may receive the third input signal S31 and the fourth input signal S32, may output a third output signal S41 whose amplitude is not converted from the third input signal S31, and may output a fourth output signal S42 whose amplitude is converted from the fourth input signal S32. The amplitude of the third input signal S31 and the amplitude of the fourth input signal S32 may be the same. However, the amplitude of the third output signal S41 and the converted amplitude of the fourth output signal S42 may be different from each other.

Here, any one of the third output signal S41 and the fourth output signal S42 may be the touch driving signal TDS or a signal related to an amplitude of the touch driving signal TDS. The other one of the third output signal S41 and the fourth output signal S42 may be one of a gate line load-free driving signal GLFD, a data line load-free driving signal DLFD, and a touch electrode load-free driving signal TLFD, or may be a signal related to an amplitude of one of the gate line load-free driving signal GLFD, the data line load-free driving signal DLFD, and the touch electrode load-free driving signal TLFD.

At least one of the gate line load-free driving signal GLFD, the data line load-free driving signal DLFD, the touch electrode load-free driving signal TLFD, and the touch driving signal TDS may be a signal whose amplitude is converted by the level shifter 820.

Accordingly, at least one of the gate line load-free driving signal GLFD, the data line load-free driving signal DLFD, and the touch electrode load-free driving signal TLFD may have an amplitude difference from the touch driving signal TDS.

Accordingly, when the touch electrode TE forms a parasitic capacitance $C_{para}$ with all or part of the plurality of data lines DL, the plurality of gate lines GL, and the remaining touch electrodes TE, the parasitic capacitance $C_{para}$ may increase at a reasonable level.

A load-free drive signal LFDS may include at least one of the gate line load-free driving signal GLFD applied to the plurality of gate lines GL, the data line load-free driving signal DLFD applied to the plurality of data lines DL, and the touch electrode load-free driving signal TLFD applied to all or part of the remaining touch electrodes TE.

The touch display device 100 may supply the touch driving signal TDS and the load-free driving signal LFDS having a phase difference to the touch display panel 110 during the touch period TS. Accordingly, a parasitic capacitance $C_{para}$ necessary for removing electromagnetic wave noise may be formed in the touch electrode TE.

The advanced load-free driving ALFD may refer to driving in which at least one load-free driving signal LFDS having a predetermined phase difference or a predetermined amplitude difference from the touch driving signal is output. The at least one load-free driving signal LFDS may include at least one of a gate line load-free driving signal GLFD, a data line load-free driving signal DLFD, and a touch electrode load-free driving signal TLFD. The phase delay circuit 810 and/or the level shifter 820 may be disposed in the touch sensing circuit 150, and may also be disposed separately from the touch sensing circuit 150.

Figure 9:
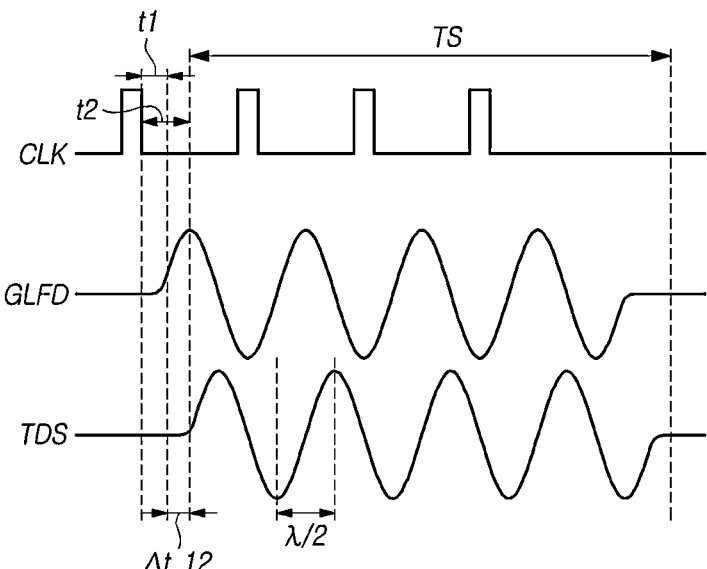
FIG. 9 illustrates a gate line load-free driving signal and a touch driving signal when performing phase difference control according to the advanced load-free driving of the touch display device according to embodiments of the present disclosure.

FIG. 9 illustrates the gate line load-free driving signal GLFD and the touch driving signal TDS when performing phase difference control according to the advanced load-free driving (ALFD) of the touch display device 100 according to embodiments of the present disclosure.

Referring to FIG. 9, for example, the gate line load-free driving signal GLFD may be applied to the plurality of gate lines GL after a first delay t1 compared to the clock signal CLK. In addition, the touch driving signal TDS may be delayed by a second time t2 different from the first time t1 compared to the clock signal CLK and applied to the touch electrode TE. As described above, each of the touch driving signal TDS and the gate line load-free driving signal GLFD may be delayed by a first time t1 and a second time t2 that are different from each other. Accordingly, the touch driving signal TDS and the gate line load-free driving signal GLFD may have a phase difference Δt_12 corresponding to the delay time difference.

Here, for example, the first time t1 may be 0 (zero). In this case, the gate line load-free driving signal GLFD may be a signal whose phase is not delayed.

The clock signal CLK may be a signal output from the touch controller 420 and input to the touch driving signal generator 430, a signal input to the touch driving circuit 440, or a signal input to the phase delay circuit 810.

Meanwhile, when the load-free driving signal LFDS has too large a phase difference with the touch driving signal TDS, the parasitic capacitance $C_{para}$ increases to a desired level or more, which causes a side effect of increasing the load, resulting in a decrease in touch sensing accuracy.

Accordingly, it may be desirable to set the phase difference between the load-free driving signal LFDS and the touch driving signal TDS at an appropriate level. The phase difference between the touch driving signal TDS and the load-free driving signal LFDS may be different depending on an environment in which the touch display device 100 is used. For example, if the phase difference between the touch driving signal TDS and the load-free driving signal LFDS does not exceed half of the wavelength (λ) of the touch driving signal TDS, the parasitic capacitance $C_{para}$ may increase at a reasonable level. See, FIG. 9 for illustration of a half wavelength (λ/2) of the touch driving signal TDS.

For example, when the phase difference Δt_12 between the gate line load-free driving signal GLFD and the touch driving signal TDS is formed not to exceed a half wavelength λ/2 of the touch driving signal TDS, immunity (EMS) to electromagnetic noise (EMI) can be improved, and an increase in load can be minimized. Accordingly, overall touch sensing accuracy can be improved.

Figure 10:
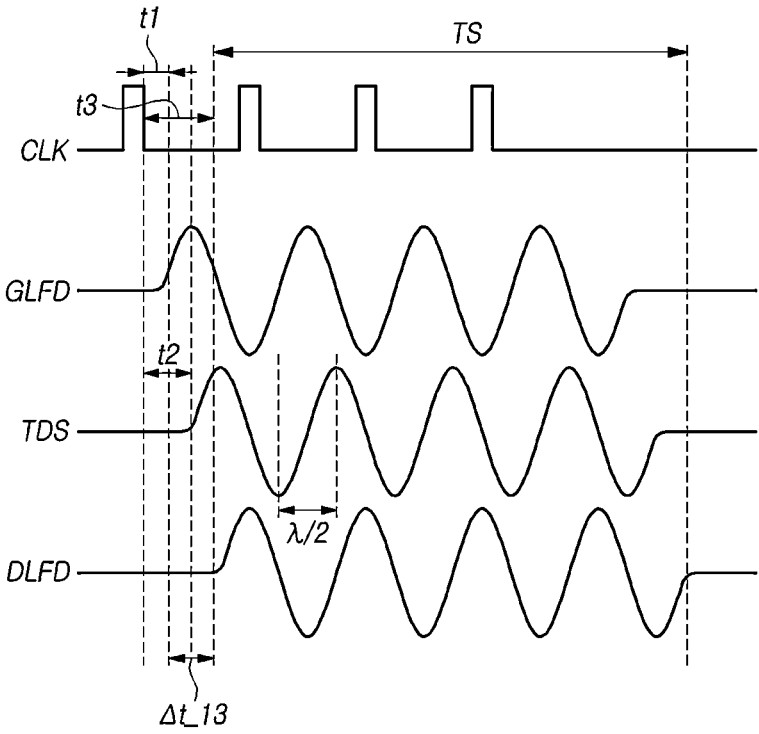
FIG. 10 illustrate a gate line load-free driving signal, a data line load-free driving signal, and the touch driving signal when performing phase difference control according to the advanced load-free driving of the touch display device according to embodiments of the present disclosure.

FIG. 10 illustrate the gate line load-free driving signal GLFD, the data line load-free driving signal DLFD, and the touch driving signal TDS when performing phase difference control according to the advanced load-free driving ALFD of the touch display device 100 according to embodiments of the present disclosure.

Referring to FIG. 10, the gate line load-free driving signal GLFD may be applied to the gate line GL with a phase difference from the touch driving signal TDS, and the data line load-free driving signal DLFD may be applied to the data line DL with a phase difference from the touch driving signal TDS.

Based on the clock signal CLK, the gate line load-free driving signal GLFD may be a signal delayed by a first time t1, the touch driving signal TDS may be a signal delayed by a second time t2, and the data line load-free driving signal DLFD may be a signal delayed by a third time t3. Here, for example, the first time t1 corresponding to delay time of the gate line load-free driving signal GLFD may be zero.

At this time, the gate line load-free driving signal GLFD and the data line load-free driving signal DLFD have a phase difference with the touch driving signal TDS, respectively, so that an appropriate level of parasitic capacitance $C_{para}$ may be formed in the touch electrode TE.

Referring to FIG. 10, the first time t1 in which the gate line load-free driving signal GLFD is delayed may be smaller than the second time t2 in which the touch driving signal TDS is delayed. In addition, the third time t3 in which the data line load-free driving signal DLFD is delayed may be greater than the second time t2 in which the touch driving signal TDS is delayed.

In order to form an appropriate level of parasitic capacitance $C_{para}$ in the touch electrode TE, the phase difference $\Delta t\_13$ according to the difference between the first time t1, which is the delay time of the gate line load-free driving signal GLFD, and the third time t3, which is the delay time of the data line load-free driving signal DLFD may be smaller than a half wavelength $\lambda/2$ of the touch driving signal TDS.

For example, the second time t2 that is the delay time of the touch driving signal TDS may be larger than the first time t1 that is the delay time of the gate line load-free driving signal GLFD. The third time t3 that is the delay time of the data line load-free driving signal DLFD may be greater than the second time t2 that is the delay time of the touch driving signal TDS. A phase difference $\Delta t\_13$ (=t3−t1) between the gate line load-free driving signal GLFD and the data line load-free driving signal DLFD may be greater than 0 and smaller than a half-wavelength $\lambda/2$ of the touch driving signal TDS. In this case, the parasitic capacitance $C_{para}$ may increase at a reasonable level. Accordingly, the touch sensing accuracy of the touch display device 100 may be increased.

Summarizing the above in terms of phase difference, each of the touch driving signal TDS and the data line load-free driving signal DLFD may have a delayed phase compared to the phase of the gate line load-free driving signal GLFD. The phase difference (t2−t1) between the touch driving signal TDS and the gate line load-free driving signal GLFD may be smaller than a phase difference (t3−t1) between the data line load-free driving signal DLFD and the gate line load-free driving signal GLFD. The phase difference (t3−t1) between the data line load-free driving signal DLFD and the gate line load-free driving signal GLFD may be less than a half-wavelength $\lambda/2$ of the touch driving signal TDS. In this case, touch sensing accuracy may be increased.

Figure 11:
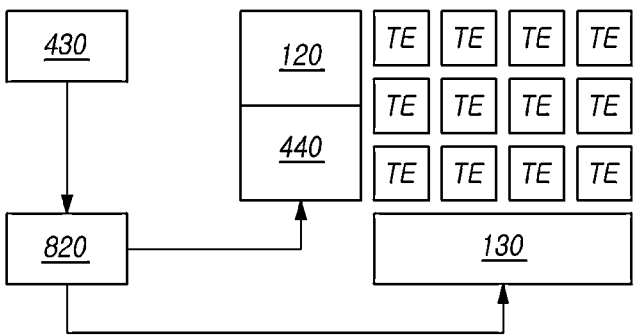
FIG. 11 illustrates amplitude difference control according to the advanced load-free driving of the touch display device according to embodiments of the present disclosure, and illustrates the touch driving signal and the load-free driving signal according to the amplitude difference control.
Figure 11:
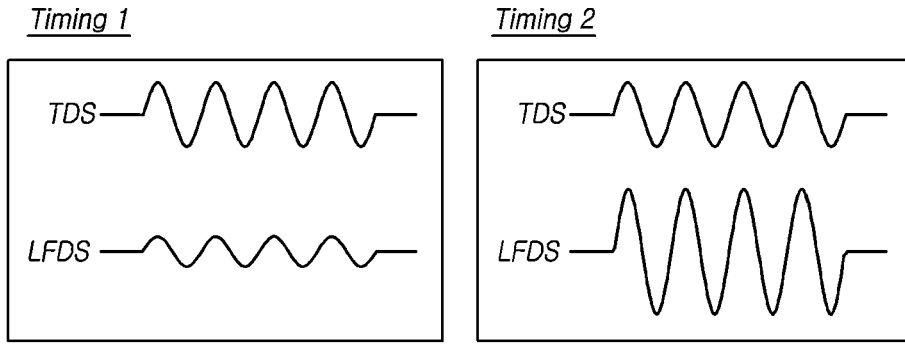

FIG. 11 illustrates amplitude difference control according to the advanced load-free driving ALFD of the touch display device 100 according to embodiments of the present disclosure, and illustrates the touch driving signal TDS and the load-free driving signal LFDS according to the amplitude difference control.

Referring to FIGS. 8A, 8B and 11, the touch display device 100 according to embodiments of the present disclosure may further include the level shifter 820 that generates a load-free driving signal LFDS having a different voltage level (or amplitude) from the touch driving signal TDS.

Referring to FIG. 11, when the load-free driving signal LFDS has a larger amplitude than the touch driving signal TDS, the touch electrode TE having a larger parasitic capacitance $C_{para}$ may be included in the plurality of touch electrodes TE. Also, when the load-free driving signal LFDS has a smaller amplitude than the touch driving signal TDS, a touch electrode TE having a larger parasitic capacitance $C_{para}$ may be included in the plurality of touch electrodes TE.

As described above, when the touch driving signal TDS is applied to the sensing target touch electrode TE, the amplitude of the load-free driving signal LFDS applied to the peripheral pattern 610 of the touch electrode TE to be sensed may be different from the amplitude of the touch driving signal TDS. Accordingly, the parasitic capacitance $C_{para}$ of the touch electrode TE to be sensed may increase. According to the position of the touch electrode TE to be sensed on the touch display panel 110, the degree of change in the amplitude of the load-free driving signal LFDS applied to the peripheral pattern 610 disposed adjacent to the touch electrode TE to be sensed may be controlled differently. For example, depending on the position of the touch electrode TE to which the touch driving signal TDS is applied in the touch display panel 110, the load-free driving signal LFDS having an amplitude difference from the touch driving signal TDS may have an amplitude greater than the amplitude of the touch driving signal TDS or may have an amplitude smaller than the amplitude of the touch driving signal TDS.

The touch period TS of the touch display device 100 may include a first period Timing 1 and a second period Timing 2. In the first period Timing 1, the load-free driving signal LFDS having an amplitude smaller than the amplitude of the touch driving signal TDS may be applied to the touch display panel 110. In the second period Timing 2, the load-free driving signal LFDS having an amplitude greater than the amplitude of the touch driving signal TDS may be applied to the touch display panel 110.

Here, the first period Timing 1 and the second period Timing 2 may be periods that do not overlap each other. Alternatively, at least a portion of the first period Timing 1 and the second period Timing 2 may overlap.

For example, the gate line load-free driving signal GLFD, which is the load-free driving signal LFDS applied to the gate line GL, and the touch driving signal TDS may have an amplitude difference.

The gate line load-free driving signal GLFD applied to the gate line GL in the first period Timing 1 of the touch period TS may have an amplitude smaller than the amplitude of the touch driving signal TDS. During the first period Timing 1, as the gate line load-free driving signal GLFD having an amplitude smaller than the amplitude of the touch driving signal TDS is applied to the gate line GL, the parasitic capacitance $C_{para}$ between the touch electrode TE and the gate line GL may increase at a reasonable level so as not to decrease the touch sensitivity.

In addition, the gate line load-free driving signal GLFD applied to the gate line GL in the second period Timing 2 may have an amplitude greater than the amplitude of the touch driving signal TDS. During the second period Timing 2, as the gate line load-free driving signal GLFD having an amplitude greater than the amplitude of the touch driving signal TDS is applied to the gate line GL, the parasitic capacitance $C_{para}$ between the touch electrode TE and the gate line GL may increase at a reasonable level so as not to deteriorate the touch sensitivity.

The touch display device 100 according to embodiments of the present disclosure may include a first region and a second region. The first region may be a region to which the load-free driving signal LFDS having an amplitude smaller than the amplitude of the touch driving signal TDS is applied during the touch period TS, and the second region may be a region to which the load-free driving signal LFDS having an amplitude greater than the amplitude of the touch driving signal TDS is applied. Therefore, according to the region where the touch electrode TE to which the touch driving signal TDS is applied is located, the load-free driving signal LFDS applied to the gate line GL, the data line DL, or the remaining touch electrodes TE, which are the peripheral patterns 610 adjacent to the touch electrode TE, may have different amplitudes.

Figure 12:
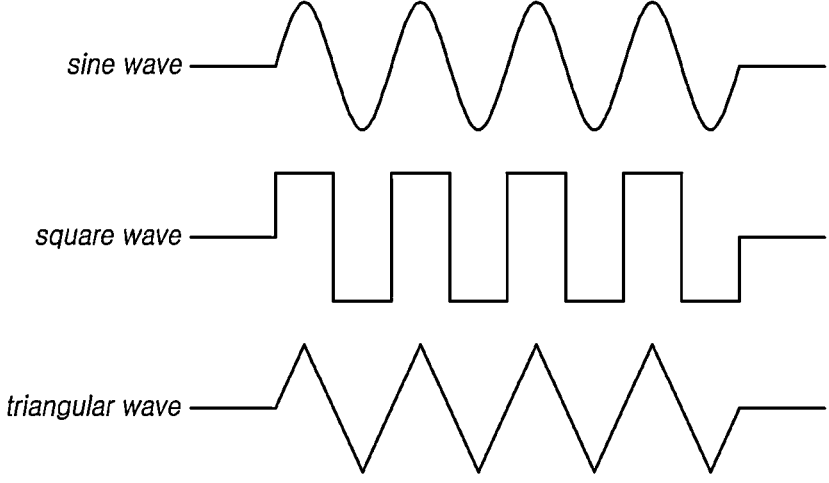
FIG. 12 is an exemplary diagram of waveforms of the touch driving signal and the load-free driving signal in the touch display device according to embodiments of the present disclosure.

FIG. 12 is an exemplary diagram of waveforms of the touch driving signal TDS and the load-free driving signal LFDS in the touch display device 100 according to embodiments of the present disclosure.

According to the advanced load-free driving (ALFD) according to embodiments of the present disclosure, the touch driving signal TDS and the load-free driving signal LFDS supplied to the touch display panel 110 have the same frequency, but may have a phase difference or an amplitude difference. In the present disclosure, supplying the load-free driving signal LFDS having a phase difference or amplitude difference from the touch driving signal TDS to the touch display panel 110 is referred to as an advanced load-free driving ALFD.

For example, a waveform of each of the touch driving signal TDS and the load-free driving signal LFDS may be a sine wave, a square wave, a triangular wave, or the like. Depending on the waveform, the degree of increase in the load of the touch electrode TE due to the phase difference or the amplitude difference may be different.

And, depending on the waveform, the degree of improvement in immunity (EMS) to electromagnetic noise due to the phase difference or the amplitude difference may vary.

Figure 13:
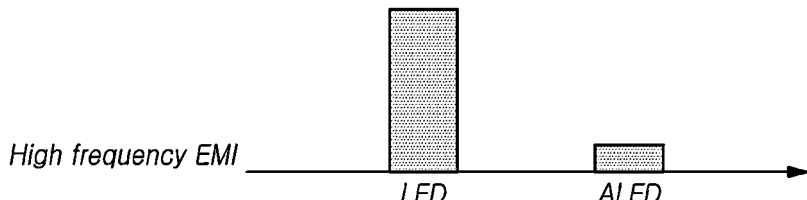
FIG. 13 shows electromagnetic wave noise immunity characteristics of each of the advanced load-free driving and the load-free driving according to embodiments of the present disclosure.

FIG. 13 shows electromagnetic wave noise immunity characteristics of each of the advanced load-free driving ALFD and the load-free driving LFD according to embodiments of the present disclosure.

The touch display device 100 according to embodiments of the present disclosure may improve immunity (EMS) to electromagnetic noise (EMI) by performing advanced load-free driving (ALFD) that increases a parasitic capacitance $C_{para}$ without adding a physical capacitor element.

Therefore, when the advanced load-free driving ALFD is performed, compared to the case where the load-free driving LFD is performed, high-frequency electromagnetic noise (EMI) can be more removed during the touch driving process, so that the touch sensing accuracy (touch sensitivity) can be improved.

Specifically, in the advanced load-free driving ALFD performed in the touch display device 100 according to embodiments of the present invention, a phase difference and/or an amplitude difference between the touch driving signal TDS and the load-free driving signal LFDS exists. In contrast, in the load-free driving LFD, a phase difference and/or an amplitude difference between the touch driving signal TDS and the load-free driving signal LFDS may not exist. Therefore, in the case of the advanced load-free driving ALFD, compared to the load-free driving LFD, the parasitic capacitance $C_{para}$ may increase. This may cause the touch sensitivity to decrease by about 7-8%.

However, in the advanced load-free driving ALFD, the high frequency electromagnetic noise (EMI) removal performance may be improved due to an increase in the parasitic capacitance $C_{para}$. Accordingly, in the advanced load-free driving ALFD, electromagnetic noise (EMI) may be reduced by approximately 90% compared to the load-free driving LFD. Accordingly, in the case of the advanced load-free driving ALFD, immunity (EMS) to electromagnetic noise (EMI) may be significantly improved.

When performing advanced load-free driving ALFD to increase the parasitic capacitance $C_{para}$ at a reasonable level, an increase in touch sensitivity due to an increase in immunity to electromagnetic noise EMI may be significantly greater than a decrease in touch sensitivity due to an increase in parasitic capacitance $C_{para}$. As a result, when the advanced load-free driving ALFD is performed, the overall touch sensitivity may be improved.

In addition, the touch display device 100 according to embodiments of the present invention can lower the cut-off frequency $f_c$ of the low-pass filter LPF, which can be configured without adding a physical capacitor element, through signal control. Accordingly, electromagnetic noise (EMI), which has a large negative effect on touch sensitivity, may be efficiently removed.

It will be apparent to those skilled in the art that various modifications and variations can be made in the touch display device and the touch sensing circuit of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a touch display panel including touch electrodes, display lines, and touch lines,
wherein a touch driving signal is configured to be applied to at least one touch electrode among the touch electrodes through at least one corresponding touch line among the touch lines during a touch period,
wherein a driving signal is configured to be applied to at least one of the display lines during the touch period,
wherein the driving signal has a same frequency as the touch driving signal and has a phase difference from the touch driving signal during the touch period, and
wherein the phase difference between the driving signal and the touch driving signal is greater than zero and less than a half of a wavelength of the touch driving signal.

2. The touch display device of claim 1, wherein:
the display lines include data lines and gate lines; and
the driving signal is configured to be applied to at least one of the data lines and the gate lines during the touch period.

3. The touch display device of claim 2, further comprising:
a data driving circuit electrically coupled to the data lines;
a gate driving circuit electrically coupled to the gate lines; and
a touch sensing circuit configured to output the touch driving signal.

4. The touch display device of claim 3, wherein:
the driving signal includes a first driving signal and a second driving signal;
the first driving signal is configured to be applied to at least one of the data lines; and
the second driving signal is configured to be applied to at least one of the gate lines.

5. The touch display device of claim 4, wherein the data driving circuit is configured to provide the first driving signal to the at least one of the data lines.

6. The touch display device of claim 4, wherein the touch display device is further configured to apply a third driving signal to one or more of the remaining touch electrodes among the touch electrodes, excluding the at least one touch electrode.

7. The touch display device of claim 4, wherein the gate driving circuit is configured to provide the second driving signal to the at least one of the gate lines.

8. The touch display device of claim 6, wherein the touch sensing circuit is configured to provide the third driving signal to the one or more of the remaining touch electrodes respectively through corresponding touch lines among the touch lines.

9. The touch display device of claim 6, further comprising:

a phase delay circuit configured to delay a phase of at least one of the first driving signal, the second driving signal, and the third driving signal.

10. The touch display device of claim 4, wherein:

the touch driving signal and the second driving signal are signals whose phases are delayed compared to the first driving signal; and the phase difference between the touch driving signal and the second driving signal is smaller than a phase difference between the second driving signal and the first driving signal.

11. The touch display device of claim 10, wherein the phase difference between the second driving signal and the first driving signal is less than a half of a wavelength of the touch driving signal.

12. The touch display device of claim 6, wherein:

the at least one touch electrode, a peripheral pattern adjacent to the at least one touch electrode, and the at least one corresponding touch line electrically connecting the at least one touch electrode and the touch sensing circuit constitute a low pass filter; and the peripheral pattern includes at least one of a data line applied with the first driving signal among the data lines, a gate line applied with the second driving signal among the gate lines, and a touch electrode applied with the third driving signal among the touch electrodes.

13. The touch display device of claim 6, wherein a waveform of each of the touch driving signal and at least one of the first, second, and third driving signal is a sine wave, a square wave, or a triangular wave.

14. The touch display device of claim 12, wherein the peripheral pattern is disposed to overlap the at least one touch electrode.

15. The touch display device of claim 9, further comprising:

a touch driving signal generator configured to generate the touch driving signal according to a touch driving generation signal and to output the generated touch driving signal to a touch driving circuit of the touch sensing circuit, wherein the phase delay circuit is disposed between the touch driving signal generator and one of the data driving circuit, the gate driving circuit, and the touch driving circuit.

16. The touch display device of claim 1, wherein the driving signal has the same frequency as the touch driving signal and has the phase difference from the touch driving signal during the entire touch period.

* * * * *